(12) United States Patent
Brown et al.

(10) Patent No.: US 8,977,775 B2
(45) Date of Patent: *Mar. 10, 2015

(54) TECHNIQUES FOR IDENTITY AND POLICY BASED ROUTING

(71) Applicant: Novell, Inc., Provo, UT (US)

(72) Inventors: Jeremy Ray Brown, Orem, UT (US); Jason Allen Sabin, Lehi, UT (US); Nathaniel Brent Kranendonk, Springville, UT (US); Kal A. Larsen, Springville, UT (US); Lloyd Leon Burch, Payson, UT (US); Stephen R. Carter, Spanish Fork, UT (US)

(73) Assignee: Novell. Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,308

(22) Filed: May 30, 2013

(65) Prior Publication Data

US 2013/0263213 A1 Oct. 3, 2013

Related U.S. Application Data

(63) Continuation of application No. 12/869,506, filed on Aug. 26, 2010, now Pat. No. 8,468,268.

(51) Int. Cl.
| | |
|---|---|
| *G06F 15/173* | (2006.01) |
| *G06F 21/60* | (2013.01) |
| *G06F 9/50* | (2006.01) |
| *H04L 12/725* | (2013.01) |

(52) U.S. Cl.
CPC ............... *G06F 21/606* (2013.01); *G06F 9/50* (2013.01); *H04L 45/302* (2013.01)
USPC ........... 709/242; 709/222; 709/226; 718/100; 718/101; 370/390; 455/414.1; 726/1; 726/15

(58) Field of Classification Search
USPC ........... 709/222, 242; 718/100, 101; 370/390; 455/414.1; 726/1, 15
See application file for complete search history.

(56) References Cited

U.S. PATENT DOCUMENTS

| | | | |
|---|---|---|---|
| 6,484,092 B2 | 11/2002 | Seibel | |
| 6,977,890 B2 | 12/2005 | Oohashi et al. | |
| 7,529,239 B2 | 5/2009 | Seppanen | |
| 7,570,628 B2 | 8/2009 | Rangarajan et al. | |
| 7,764,678 B2 | 7/2010 | Johnson et al. | |
| 7,779,065 B2 | 8/2010 | Gupta et al. | |
| 8,176,490 B1 * | 5/2012 | Jackson | 718/100 |
| 2006/0258341 A1 * | 11/2006 | Miller et al. | 455/414.1 |
| 2009/0019164 A1 | 1/2009 | Brown et al. | |
| 2010/0329252 A1 * | 12/2010 | Mulamalla et al. | 370/390 |
| 2011/0093849 A1 * | 4/2011 | Chawla et al. | 718/1 |
| 2012/0054368 A1 | 3/2012 | Brown et al. | |

* cited by examiner

*Primary Examiner* — Kyung H Shin
(74) *Attorney, Agent, or Firm* — Schwegman Lundberg & Woessner, P.A.

(57) ABSTRACT

Techniques for identity and policy based routing are presented. A resource is initiated on a device with a resource identity and role assignments along with policies are obtained for the resource. A customized network is created for the resource using a device address for the device, the resource identity, the role assignments, and the policies.

20 Claims, 4 Drawing Sheets

TECHNIQUES FOR IDENTITY AND POLICY BASED ROUTING

RELATED APPLICATION

This application is a continuation of U.S. patent application Ser. No. 12/869,506, filed on Aug. 26, 2010, which is incorporated herein by reference in its entirety.

BACKGROUND

Cloud computing is rapidly changing the Internet into a collection of clouds, which provide a variety of computing resources, storage resources, and, in the future, a variety of resources that are currently unimagined. This new level of virtualization has unbounded the physical and geographical limitations of traditional computing. However, existing networking technology still binds virtualization software to physical limitations because it is still largely based on physical devices and manual mechanisms.

The current networking technology of today is based upon static networks and Internet Protocol (IP) based routing. So, as companies move to the new technology of Intelligent Workload Management with transparency and flexibility in their environments the traditional IP networking model fails to meet their needs.

This is so because network routing has always been separate from the software services that rely on network routing for network connectivity. Traditional network routing is done independent of the software services and has less than adequate ability to verify software logic in terms of business intelligence.

For example, if there is a financial server, then that server should not be accessible to machines that are not verified with security mechanisms in the network. With traditional approaches, the financial server is manually configured for network routing; so, hopefully someone does not plug a wrong machine address into the wrong network routing table, such that the financial server is compromised by a machine or service not authorized to access the financial server.

SUMMARY

Techniques for identity and policy based routing are presented. More particularly, and in an embodiment, a method for identity and policy based routing is described. A workload is initiated on a first device and the workload is authenticated to an identity service to establish a workload identity. Next, access privileges, role assignments, and policies are set for the workload. The access privileges, the role assignments, and the policies are acquired from the identity service in response to the workload identity. Then, the workload is registered, via the workload identity, as a customized network; the customized network based on: the workload identity, the role assignments, and the policies. Finally, one or more network routes are built for the workload that identifies network access routes to other devices and/or other workloads on the customized network, and the one or more network routes are based on: the workload identity, the role assignments, and the policies.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "workload" as used herein refers to a special type of resource, such as a Virtual Machine (VM), an Operating System (OS), a cloud, a hardware device, an agent, and an application.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
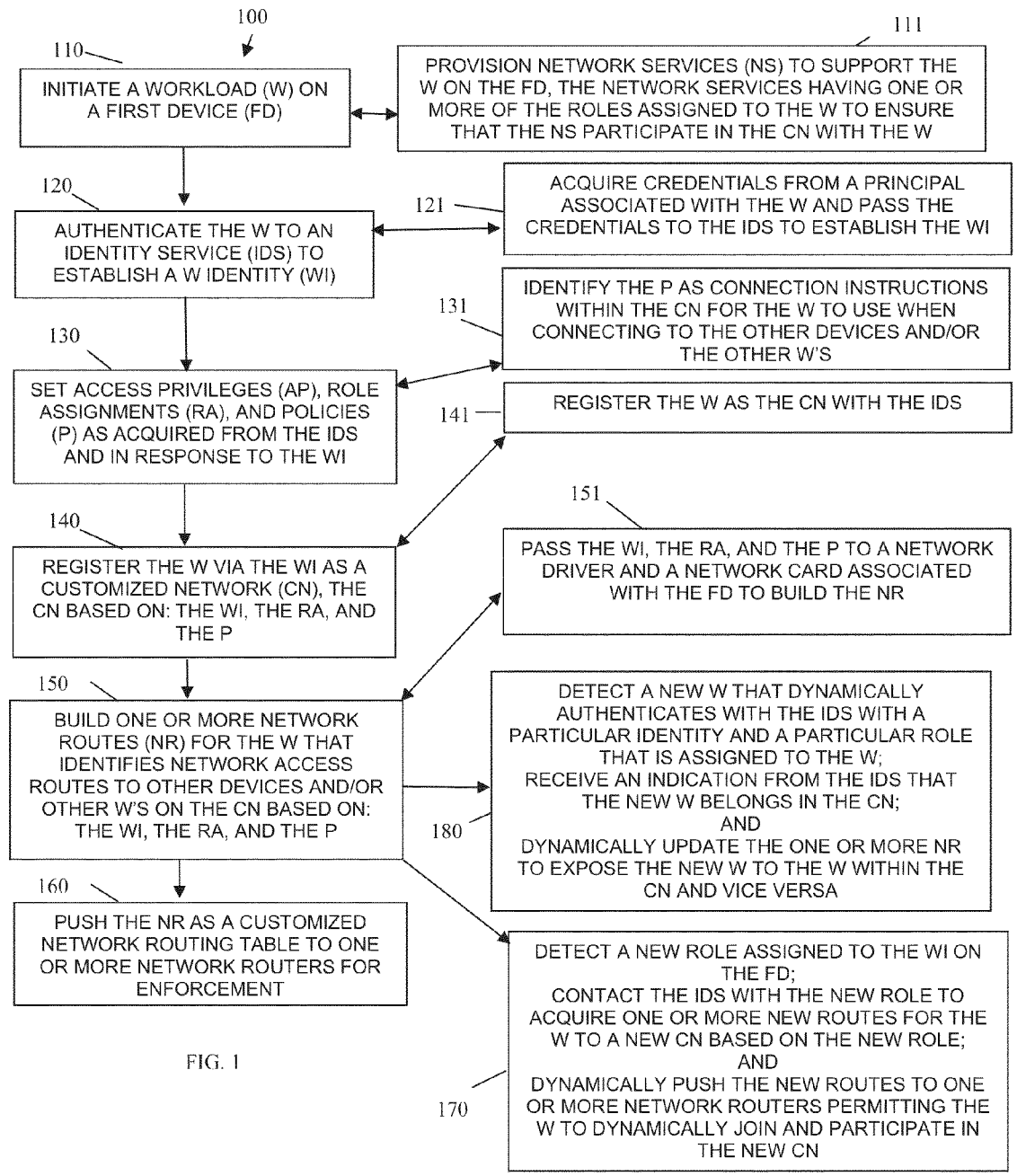
FIG. 1 is a diagram of a method for identity and policy based routing, according to an example embodiment.

FIG. 1 is a diagram of a method 100 for identity and policy based routing, according to an example embodiment. The method 100 (hereinafter "custom network routing service") is implemented in a machine-accessible and non-transitory computer-readable medium as instructions that execute on one or more processors (machines, computers, processors, etc.). The machines are specifically configured to process the custom network routing service. Furthermore, the custom network routing service is operational over and processes within a wide-area network (WAN). The WAN may be wired, wireless, or a combination of wired and wireless. In an embodiment, the WAN is the Internet.

At 110, the custom network routing service initiates a workload on a first device. Here, the first device is a processor-enabled device, such as a computer, a phone, a tablet, a personal digital assistant, and the like. The workload can be an OS, a cloud, a VM, an application, another software service, and the like. The custom network routing service configures and starts the workload on the first device.

According to an embodiment, at 111, the custom network routing service provisions network services for purposes of supporting the workload on the first device. These network services have one or more roles assigned to the workload that they share with the workload. This ensures that the network services participate in a custom network (mentioned below) with the workload. Some example network services can include, but are no limited to, a Domain Name System (DNS) service, a Dynamic Host Configuration Protocol service, a Network Time Protocol (NTP) service, and others.

At 120, the custom network routing service authenticates the workload on the first device. For security the workload itself is authenticated before normal operation of the workload is permitted on the first device. The workload is authenticated to an identity service (identity based and policy based authentication service) to establish a workload identity for the workload.

In an embodiment, at 121, the custom network routing service acquires credentials from a principal associated with the workload. These credentials are passed to the identity service for purposes of establishing the workload identity.

At 130, the custom network routing service sets access permissions, role assignments, and policies for the workload. The access permissions, role assignments, and policies are acquired from the identity service based on the workload identity and the authentication mentioned above with respect to the processing at 120.

It is again noted that the identity service manages and distributes the access permissions, the role assignments, and the policies.

In one scenario, at 131, the custom network routing service identifies the policies as connection instructions within a customized network (discussed below with reference to the processing at 140) for the workload to use when connecting to other devices and/or other workloads permitted to participate in the customized network. So, the manner of establishing connections can be defined in a number of the policies and the policies are acquired based on the workload identity.

At 140, the custom network routing service registers the workload (using the workload identity) as a customized network. The customized network is formulated based on the workload identity, the role assignments, and the policies. The customized network may be viewed as a virtual network or even a Virtual Private Network (VPN) and it defines all the other resources and/or devices (it is noted a device is a type of resource) that the workload can see and can access. It is also noted that at least initially, the customized network may just include the workload by itself on the first device; subsequent to this other workloads and/or devices can dynamically register and join in the customized network.

According to an embodiment, at 241, the custom network routing service registers the workload with the customized network via the identity services. That is, in one embodiment, the identity service may serve as a registration service or may facilitate the registration of the customized network for the custom network routing service.

At 150, the custom network routing service builds one or more network routes for the workload that identifies network access routes to other devices and/or other workloads on the customized network based on the workload identity, the role assignments, and the policies. The network routes combined with the policies permit the workload to contact and interface over a WAN (can also be a Local Area Network (LAN)) with the other devices and/or workloads. The connection protocols and services can be defined in the policies, which are customized for the role assignments and the workload identity.

According to an embodiment, at 151, the custom network routing service passes the workload identity, the role assignments, and the policies to a network driver and a network card associated with the first device to build the network routes. That is, existing network devices and network cards can be enhanced to build routes based on the policies and role assignments supplied by the identity service.

In one case, at 160, the custom network routing service pushes the network routes as a customized network routing table to one or more network routers for enforcement. So, existing routers require no modification and can use the routing tables supplied by the custom network routing service. Although in some instances, enhanced network routers may be used to recognize and enforce some policies that may be included, in some instances, in the network routing table.

In another scenario, at 170, the custom network routing service detects a new role assigned to the workload identity on the first device. Here, the workload may be dynamically based on policy evaluation and assume a new role that was previously not activated. In response to this situation, the custom network routing service contacts the identity service with the new role for purposes of acquiring one or more new routes for the workload to a new customized network based on the new role. Essentially, by changing to a previously inactive role, the workload dynamically joins a new customized network that is in operation; can cause creation of an entirely new customized network; so, activation of a previously inactive role may also create a new customized network. Next, the custom network routing service pushes the new routes to one or more network routers thereby permitting the workload to dynamically join and participate in the new customized network.

In still another situation, at 180, the custom network routing service detects a new workload that dynamically authenticates to the identity service with a particular identity and a particular role. In this case, the particular role is one that is already assigned to the workload. The custom network routing service receives an indication from the identity service that the new workload belongs in the customized network. So, the custom network routing service dynamically updates the one or more network routes to expose the new workload to the workload within the customized network and vice versa (to expose the workload to the new workload).

Figure 2:
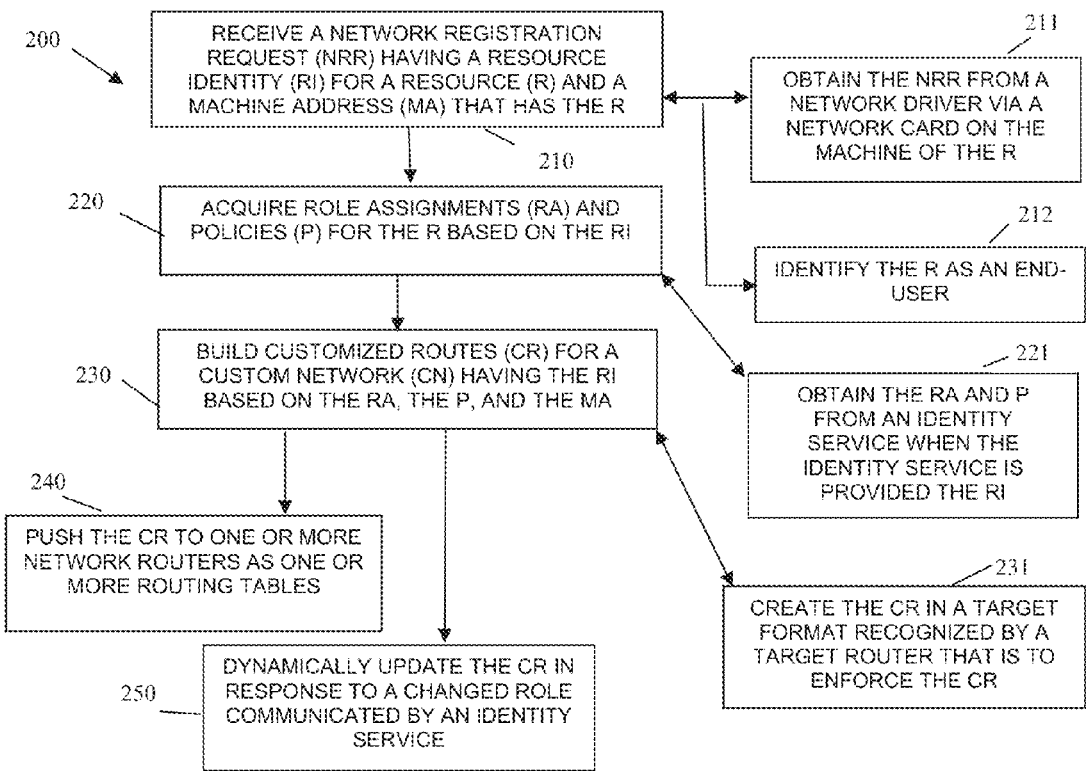
FIG. 2 is a diagram of another method for identity and policy based routing, according to an example embodiment.

FIG. 2 is a diagram of another method 200 for identity and policy based routing, according to an example embodiment. The method 100 (hereinafter "network registration service") is implemented in a machine-accessible and non-transitory computer-readable medium as instructions that execute on one or more processors (machines, computers, processors, etc.). The machine is specifically configured to process the network registration service. Furthermore, the network registration service is operational over and processes within a wide-area network (WAN). The WAN may be wired, wireless, or a combination of wired and wireless. In an embodiment, the WAN is the Internet.

The custom routing network service represented by the method 100 of the FIG. 1 is presented from the perspective of multiple components that provide custom network routing based on identity and policies. The network registration service is presented from the perspective one component, namely the registration component and route building component. In this sense, the network registration service expands upon one aspect of the custom routing network service described with respect to the method 100 of the FIG. 1.

At 210, the network registration service receives a network registration request, which includes a resource identity for a resource and a machine address that is executing or that has the resource. It is noted that the machine address may be for a VM where the resource operates or can be a set of addresses for a cloud environment where the resource is permitted to operate. The machine address can also be a traditional IP address for the processing device of the resource.

According to an embodiment, at 211, the network registration service obtains the network registration request from a network driver via a network card on the machine of the resource. This scenario was described above with reference to the processing at 151 of the FIG. 1 and is described below with reference to the FIG. 4.

In another situation, at 212, the network registration service identifies the resources as an end-user. So, the resource can be an actual end-user where routing is based on the identity of the user, roles assigned to the user, and policies assigned to the identity and roles.

At 220, the network registration service acquires role assignments and policies for the resource based on the resource identity.

In an embodiment, at 221, the network registration service obtains the role assignments and the policies from an identity service when the identity service is provided the resource identity and has either authenticated the resource or relies on an assertion that the resource is authenticated from a trusted relationship with the network registration service.

At 230, the network registration service builds customized routes for a customized network that includes the resource identity based on the role assignments, the policies, and the machine address for the resource (acquired at 210 above).

In one scenario, at 231, the network registration service creates the customized routes in a target format recognized by a target router that is to enforce the customized routes. Here, the network registration service generates the customized routes on demand in a format that can be processed by a target router for handling network traffic over the customized network.

In an embodiment, at 240, the network registration service pushes the customized routes to one or more network routers as one or more routing tables.

In another case, at 250, the network registration service dynamically updates the customized routes in response to a changed role communicated by an identity service. The customized routes can be modified, deleted, and reconstituted based on dynamic changing conditions as defined by the policies and based on the roles and identities of the resource and other resources.

Figure 3:
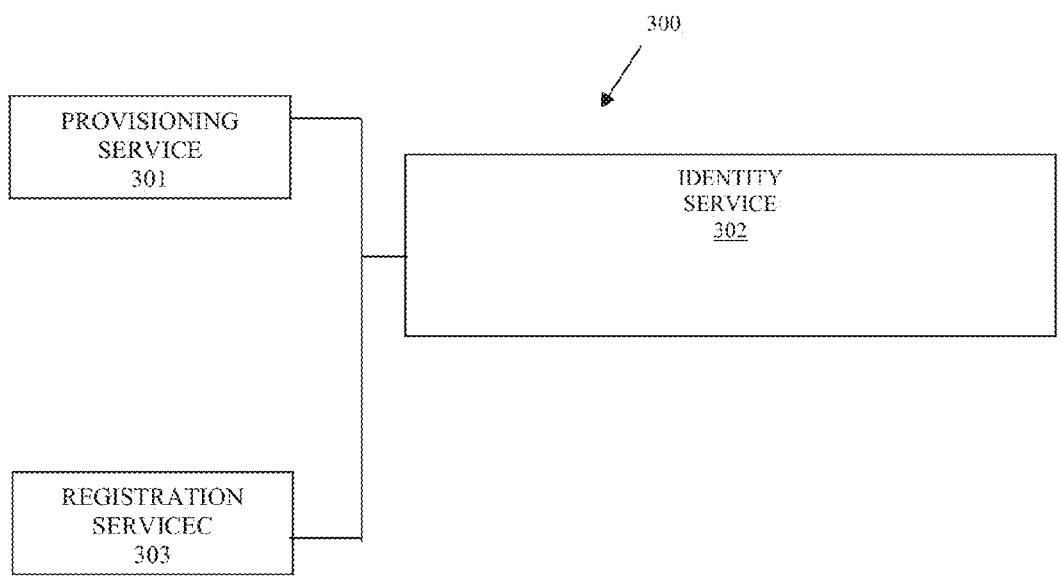
FIG. 3 is a diagram of an identity and policy based routing system, according to an example embodiment.

FIG. 3 is a diagram of an identity and policy based routing system 300, according to an example embodiment. The identity and policy based routing system 300 is implemented in a machine-accessible and non-transitory computer-readable medium as instructions that execute on multiple processors (machines, computers, processors, etc.). The machines are specifically configured to process the identity and policy based routing system 300. Furthermore, the identity and policy based routing system 300 is operational over and processes within a wide-area network (WAN). The WAN may be wired, wireless, or a combination of wired and wireless. In an embodiment, the WAN is the Internet.

In an embodiment, the identity and policy based routing system 300 implements, inter alia, the methods 100 and 200 of the FIGS. 1 and 2, respectively.

The identity and policy based routing system 300 includes a provisioning service 301, an identity service 302, and a registration service 303. Each of these components and their interactions with one another will now be described below in turn.

The provisioning service 301 is configured on and executes on one or more processors. The one or more processors are specifically configured to execute the provisioning service 301, which is executable instructions residing on one or more of the processors in a non-transitory computer or machine-readable storage format. Example processing associated with the provisioning service 301 was discussed above with reference to the method 100 of the FIG. 1.

The provisioning service 301 is configured to instantiate a resource on a first device. The resource can be a workload as discussed with reference to the FIG. 1 or can be any type of resource as defined above, including a user, a directory, a group of users, etc.

In an embodiment, the provisioning service 301 is also configured to initiate a network driver on the first device. The network driver participates in the customized network and securely communicates with the registration service 303 to initiate building the custom routes of the customized network.

In another case, the provisioning service 301 is configured to contact the identity service 302 for purposes of acquiring the resource identity for the resource, the roe assignments for the resource identity, and policies to enforce against both the resource identity and the resource role assignments.

The identity service 302 is configured on and executes on one or more processors. The one or more processors are specifically configured to execute the identity service 302, which is executable instructions residing on one or more of the processors in a non-transitory computer or machine-readable storage format. Example processing associated with the identity service 302 was discussed above with reference to the methods 100 and 200 of the FIGS. 1 and 2, respectively.

The identity service 302 is configured to authenticate the resource and supply a resource identity along with role assignments and policies. The identity service 302 manages the resource identity and its association to role assignments and the policies that drive the role assignments and that may also define connection instructions for connection and participating in the customized network.

The registration service 303 is configured on and executes on one or more processors. The one or more processors are specifically configured to execute the registration service 303, which is executable instructions residing on one or more of the processors in a non-transitory computer or machine-readable storage format. Example processing associated with the registration service 303 was discussed above with reference to the methods 100 and 200 of the FIGS. 1 and 2, respectively.

The registration service 303 is configured to use the resource identity, the role assignments, and the policies to build custom routes for a custom network that the resource belongs to.

According to an embodiment, the registration service 303 is also configured to verify the resource identity, the role assignments, and the policies via the identity service 302. So, an additional check can be made to ensure no tampering has occurred. In other cases, the registration service 303 may independently acquire the role assignments and policies from the identity service 302 when building the custom network.

Figure 4:
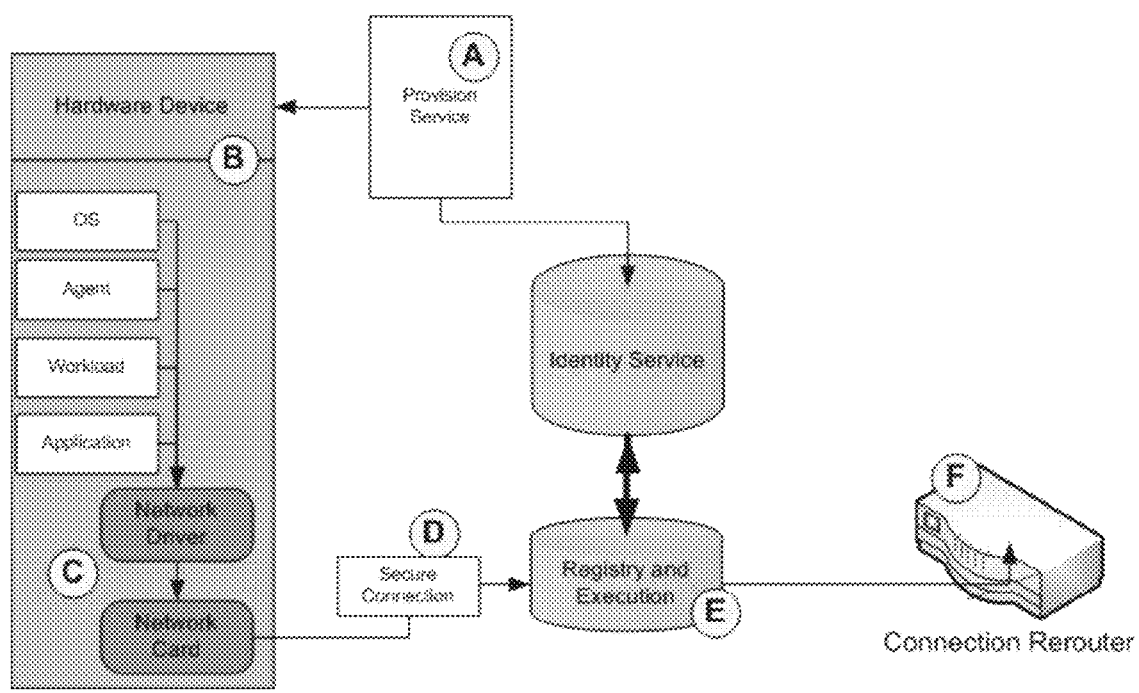
FIG. 4 depicts an example architecture for identity and policy based routing, according to an example embodiment.

FIG. 4 depicts an example architecture for identity and policy based routing, according to an example embodiment. It is noted that the architecture shown in the FIG. 4 is presented for purposes of illustration only as other components or less components can be used to realize the teachings presented herein. Therefore, the specific illustration of the FIG. 4 is not intended to limit the teachings in any manner.

Item A is an initial action for provisioning a resource (here a Hardware Device in the FIG. 4). With provisioning, the resource is either created or enabled to access services on its device. This provisioning has two components where they talk to the resource and to the identity service, which is where access/role/policies are built to handle the traffic.

Item B is where provisioning service is talking to the resource, which can reside in a number of different formats. It is noted that Item A is talking with B to give B permission or security to talk with Item E over a secure channel. This secure channel can be Secure Sockets Layer (SSL) or any other form of secure communication to allow Item D to talk.

Item C is focusing upon the communication between the driver/card to the registry for the re-router. In B, information is passed to make the secure connection correctly and to authenticate the connection.

Item D is the secure connection that allows connection to the network driver/network card of the device being used by the resource.

Item E shows that once connection to the registry has been made, then data associated with a Media Access Control (MAC) address/IP address/device address can be synchronized with the identity service data. Now the registry has worked correctly over a secure connection and data can be properly executed for routing within the customized network. This entails taking identity/role/policies and device data of IP address/MAC address/Device address and building a routing table for the customized network.

E (last action) takes the routing table and pushes it to the router at F, which will take the data and actually make connections between the boxes.

It is noted that routes between connection re-routers can be made as well.

The teachings herein permit controlling of networking access through identity and policies on the network level. Each resource is considered a network of one and the only access to anything is through the mechanism that builds the route individually based upon identity of the resource and policy of how the resource can connect. The techniques are controlling dynamically the access to resources instead of static connections that are not controlled through business logic. This is especially apparent in virtualization networks where one is at the mercy of the network configuration and one does not fully understand that connection.

The techniques presented can also be viewed from a different perspective (as discussed with the method 200 of the FIG. 2). The workload/resource connects through the network but also the users can be the resource. So, if one bases connections on what user is on the system, then the techniques permit building and destroying dynamic routes in the networks. As a user connects to a box (device) his/her account is given access to the machines for his/her roles. Once he/she disconnects then the routes are removed.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
    registering a workload via its authenticated workload identity as a customized network, the customized network a Virtual Private Network (VPN) that defines resources and devices visible to the workload, and at least some devices dynamically join the VPN; and
    dynamically building network routes for the workload that defines access routes to other devices and other workloads based on customized network and detecting a new role assigned to the workload identity in response thereto contacting an identity service with the new role and receiving from the identity service one or more new routes from the identity service to a new customized network based on the new role supplied to the identity service and dynamically joining the workload to the new customized network.

2. The method of claim 1, wherein registering further includes recognizing the workload as being active on a phone or a tablet.

3. The method of claim 2, wherein recognizing further includes provisioning services for the workload on the phone or the tablet.

4. The method of claim 3, wherein provisioning further includes assigning security roles to each provisioned service, each security role assigned to the workload on the phone or the tablet.

5. The method of claim 1, wherein registering further includes authenticating the workload for a device processing the workload to acquire the authenticated workload identity.

6. The method of claim 5, wherein authenticating further includes dynamically acquiring credentials from a principal tied to the workload for authenticating the workload.

7. The method of claim 1, wherein registering further includes assigning security settings for the workload based on the workload identity.

8. The method of claim 7, wherein registering further includes acquiring policies for enforcement against the customized network based on the workload identity.

9. The method of claim 8, wherein acquiring further includes building the network routes based on the workload identity, the policies, and the security settings.

10. A method implemented in a non-transitory machine-readable storage medium and processed by one or more processors configured to perform the method, comprising:
    acquiring role assignments and policies for the resource based on an authenticated resource identity; and
    building network routes for a custom network having the resource identity based on the role assignments, the policies, and the authenticated resource identity and dynamically moving the resource to a new custom network based on when a new role assigned to the resource and contacting an identity service with the new role and receiving from the identity service one or more new routes from the identity service to the new custom network based on the new role supplied to the identity service and dynamically joining the resource to the new custom network.

11. The method of claim 10 further comprising, installing the network routes as one or more routing tables in one or more network routers.

12. The method of claim 10 further comprising, dynamically updating the network routes in response to a detected role or policy change.

13. The method of claim 10, wherein acquiring further includes obtaining a machine address that is processing the resource.

14. The method of claim 13, wherein building further includes also using the machine address to build the network routes.

15. The method of claim 14, wherein using further includes recognizing the machine as a phone or a tablet device.

16. The method of claim 10, wherein building further includes creating the network routes in a format recognized by a router that is to enforce the network routes.

17. The method of claim 10, wherein building further includes creating the network routes on demand.

18. A multi-processor implemented system, comprising:
a memory having a provisioning service configured to execute on one or more processors from the memory; and
the memory having a registration service configured to execute on one or more of the processors from the memory;
the provisioning service is configured to instantiate a resource on a mobile device, the registration service is configured to use an authenticated resource identity for the resource, role assignments and policies to build network routes for a custom network that the resource belongs to and the custom network is a virtual network having other resources and other devices defined that a workload can see and can access and wherein other workloads and other devices dynamically register and join the custom network and the provisions service configured to move the resource to a new custom network based on when a new role assigned to that resource by contacting an identity service with the new role and receiving from the identity service one or more new routes from the identity service to the new custom network based on the new role supplied to the identity service and dynamically joining the resource to the new custom network.

19. The system of claim 18, wherein the mobile device is a phone or a tablet device.

20. The system of claim 18, wherein an identity service is consulted to authenticate the resource and provided the authenticated resource identity, the role assignments, and the policies.

* * * * *